(12) United States Patent
Miesak (10) Patent No.: US 6,879,606 B1
(45) Date of Patent: Apr. 12, 2005

(54) INTRACAVITY DOUBLED LASER

(75) Inventor: Edward Miesak, Orlando, FL (US)

(73) Assignee: Laser Vision Technologies, Aloha, OR (US)

( * ) Notice: Subject to any disclaimer, the term of this patent is extended or adjusted under 35 U.S.C. 154(b) by 791 days.

(21) Appl. No.: 09/650,965

(22) Filed: Aug. 29, 2000

Related U.S. Application Data (60) Provisional application No. 60/177,754, filed on Jan. 24, 2000, and provisional application No. 60/145,615, filed on Jul. 26, 1999.

(51) Int. Cl.[7] .................................................. H01S 3/13
(52) U.S. Cl. ........................................................ 372/31
(58) Field of Search ............................ 372/25, 26, 30, 372/38.06, 70–72, 75, 31

(56) References Cited

U.S. PATENT DOCUMENTS

| | | | |
|---|---|---|---|
| 4,493,086 A | * | 1/1985 | Jain et al. ........................ 372/21 |
| 4,514,848 A | * | 4/1985 | Witte et al. ..................... 372/25 |
| 4,731,787 A | | 3/1988 | Fan et al. |
| 4,809,291 A | | 2/1989 | Byer et al. |
| 5,128,601 A | * | 7/1992 | Orbach et al. ................. 372/30 |
| 5,574,740 A | | 11/1996 | Hargis et al. |
| 5,610,934 A | | 3/1997 | Zarrabi |
| 5,622,849 A | | 4/1997 | Fusho et al. |
| 5,627,849 A | | 5/1997 | Baer |
| 5,832,013 A | | 11/1998 | Yessik et al. |
| 5,889,798 A | | 3/1999 | Molva et al. |

OTHER PUBLICATIONS

*IEEE Theory of Intracavity Optical Second–Harmonic Generation* ; by Bell Telephone Laboratories, Inc., Richard G. Smith; Journal of Quantum Electronics, vol. QE–6, No. 4, Apr. 1970; pp. 215–223.

* cited by examiner

*Primary Examiner*—Paul Ip
*Assistant Examiner*—Davienne Monbleau
(74) *Attorney, Agent, or Firm*—Chernoff Vilhauer McClung & Stenzel, LLP (57) ABSTRACT

An optical device has a first medium that produces more photons that exit the first medium than enter the first medium, such as a gain material. A second medium that produces light of a different wavelength than the wavelength of light incident thereon, such as a second harmonic generator. The optical device defines a cavity including the first medium and the second medium. An energy source provides energy to at least one of the first medium and the second medium so that light exits the cavity, the energy source is modified in a number of different manners such that the optical device has decreased noise output.

75 Claims, 5 Drawing Sheets

INTRACAVITY DOUBLED LASER

This application claims the benefit of U.S. Provisional Application No. 60/145,615, filed Jul. 26, 1999 and U.S. Provisional Application No. 60/177,754, filed Jan. 24, 2000.

TECHNICAL FIELD

The present invention relates to an intracavity doubled laser.

BACKGROUND ART

A laser is a light generator which typically produces coherent, directional, substantially monochromatic, and intense light. Laser light is generated by inputting energy to a specific medium which stores the energy for some length of time. Much of this energy can be extracted in the form of light by sending photons of an appropriate wavelength into the medium. As the photons pass though the medium they can "stimulate" additional photons, typically identical in every way, to exit the medium. The result is that more photons exit the medium than enter. The medium, therefore, is generally referred to as a "gain" medium, and more specifically, a non-linear gain medium. In order to reach large net gains the photons should be passed through the gain medium as many times as possible. This is routinely done by using an optical "cavity" composed of two or more mirrors (or reflecting surfaces). The mirrors are configured in such a fashion as to maintain the movement of the photons to a single recurring path through the gain medium. The mirrors and materials may be located inside an open cavity, if desired. Usually one of the cavity mirrors is less than 100% reflecting causing a small percentage of light to "leak" out every time photons impinge on it. This mirror is frequently referred to as the "output coupler". The light "leaking" through the output coupler becomes the laser output which is less intense than the light inside the cavity. As an example, assume that the output coupler is the only lossy mirror, the remaining cavity mirrors being 100% reflecting. The intracavity optical power will be greater than the output beam power by the ratio of the output power divided by the output coupler transmittance (1-reflectance). Now assume that the output coupler is 60% reflecting and the output beam power is 1.3 watts. The circulating (intracavity) power will be 1.3/(1−0.6) or 3.25 watts.

Figure 1:
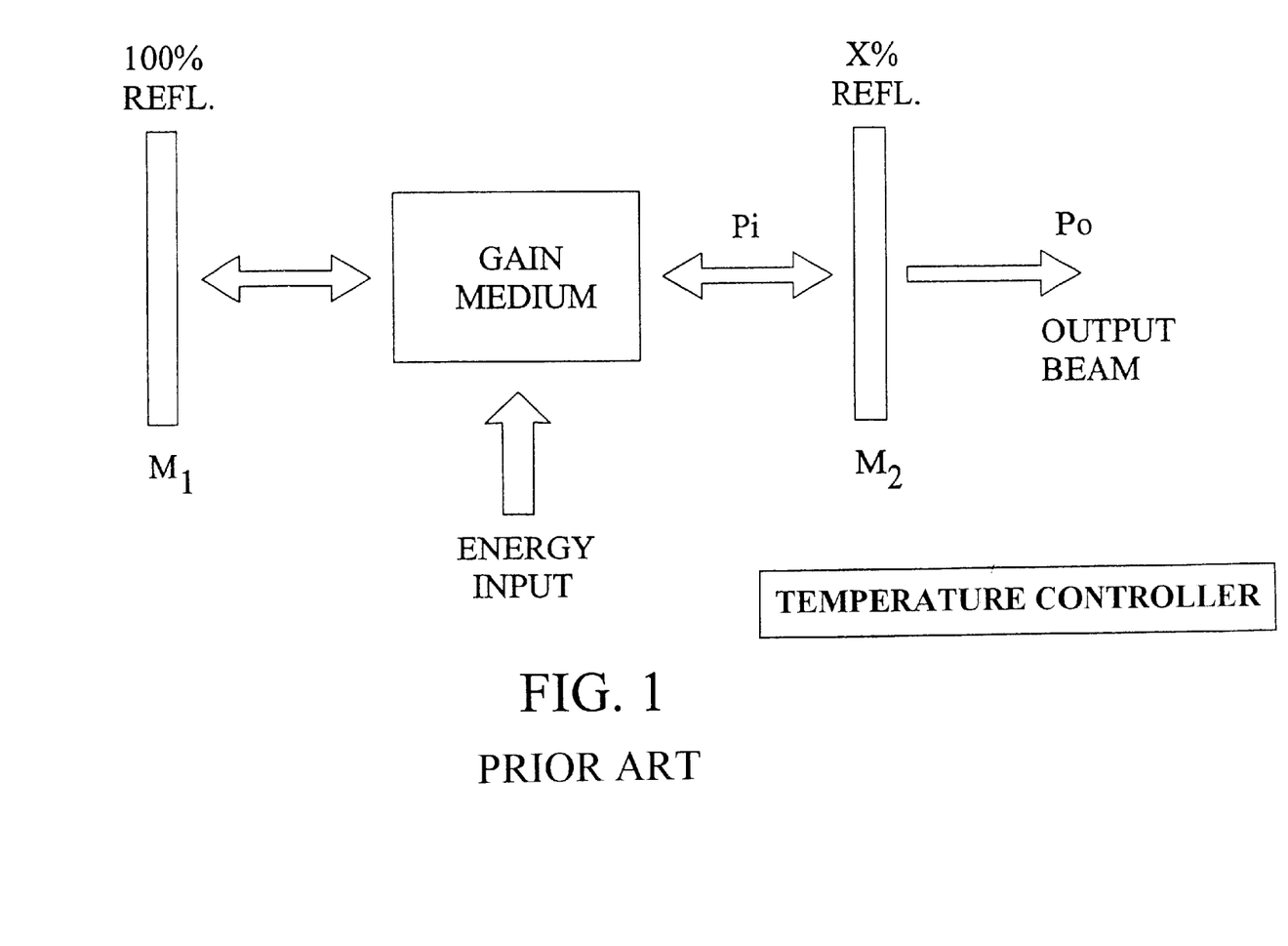
FIG. 1 is a diagram of a basic laser device.

There is normally an optimum reflectance for the output coupler in each laser design which produces maximum output power. Referring to FIG. 1, a basic laser includes a pair of reflecting surfaces M1 and M2 parallel with each other, causing photons to "bounce" between the mirrors many times before escaping the optical cavity (defined by mirrors M1 and M2). M2 is less than 100% reflecting which defines it as the output coupler. The output beam power may be measured (Po). Knowing the reflectivity of M2 (X %), one can calculate the power of the beam inside the optical cavity (Pi) in the following manner: $Pi=Po/(1-(X/10))$.

Nonlinear optics is the study of phenomena that occurs as a consequence of the modification of the optical properties of a material system by the presence of light. Typically, only laser light is sufficiently intense to modify the optical properties of a material system. Nonlinear phenomena are "nonlinear" in the sense that they occur when the response of a material system to an applied optical field depends in a nonlinear manner upon the strength of the optical field. As an example, second harmonic generation (SHG) occurs as a result of the part of the atomic response that depends quadratically on the strength of the applied optical field. Consequently, the intensity of the light generated at the second harmonic frequency (2ω) tends to increase as the square of the intensity of the applied laser light (fundamental, ω) making SHG a nonlinear process.

Under proper conditions, the process of second harmonic generation can be so efficient that most of the power in the incident radiation at frequency w is converted to radiation at the second harmonic frequency 2ω. One common use of SHG is to convert the output of a fixed frequency laser. For example, a Nd:YAG laser typically operates in the near infrared at a wavelength of 1.063 µm. Second harmonic generation is routinely used to convert the wavelength of the radiation to 0.532 µm, in the middle of the visible spectrum.

Various materials can be used to perform SHG on different wavelengths of laser light. Not all materials will perform well over the entire optical spectrum. Two crystals commonly used to perform SHG with Nd:YAG lasers is Potassium Titanyl Phosphate ($KTiOPO_4$), usually referred to as KTP, and Potassium Niobate ($LiNbO_3$). KTP efficiently doubles 1.064 µm wavelength light and $LiNbO_3$ efficiently double 0.946 µm wavelength light which a Nd:YAG laser can also produce.

The efficiency of the SHG process increases with the incident intensity of the fundamental laser beam. Intracavity laser power is usually higher than the output beam power from the laser. These two factors motivate laser designers to place the SHG crystal (the material) inside the laser cavity along with the gain medium. Smith, Theory of Intracavity Optical Second-Harmonic Generation, IEEE Journal of Quantum Electronics, Volume QE-6, Number 4, April 1970, Pages 215–223, describes the basic fundamentals of intracavity optical second harmonic generation and is incorporated by reference herein. Under this condition the laser cavity mirrors are usually chosen to reflect 100% of the fundamental light to keep the intracavity power as high as possible. The SHG crystal coverts the circulating laser light (fundamental) to a wavelength (second harmonic) which is not reflected by the cavity mirrors. In order to send all the generated second harmonic light out in one beam, all the laser cavity mirrors (with the exception of the output coupler) are designed to also reflect 100% of the second harmonic wavelength. The output coupler is designed to reflect 100% of the fundamental light but transmit 100% of the second harmonic light.

A microchip laser exploits the intracavity doubling concept and couples to it large scale manufacturability and ease of use by the consumer. It is usually fabricated from two crystals (gain medium, SHG) attached together and polished such that their outside surfaces are parallel with each other. Appropriate optical coatings are placed on the outside surfaces of the crystals which subsequently defines the laser cavity. Several examples of microchip lasers are disclosed in U.S. Pat. Nos. 5,610,934, 5,574,740, 4,731,787, and 5,889, 798, all incorporated by reference herein. The two crystals together generally forming the "cavity" are constructed using known techniques. A diode layer "pump" provides the input energy to the gain medium of the microchip laser. The diode pump is a device that provides energy to the laser cavity.

Figure 2:
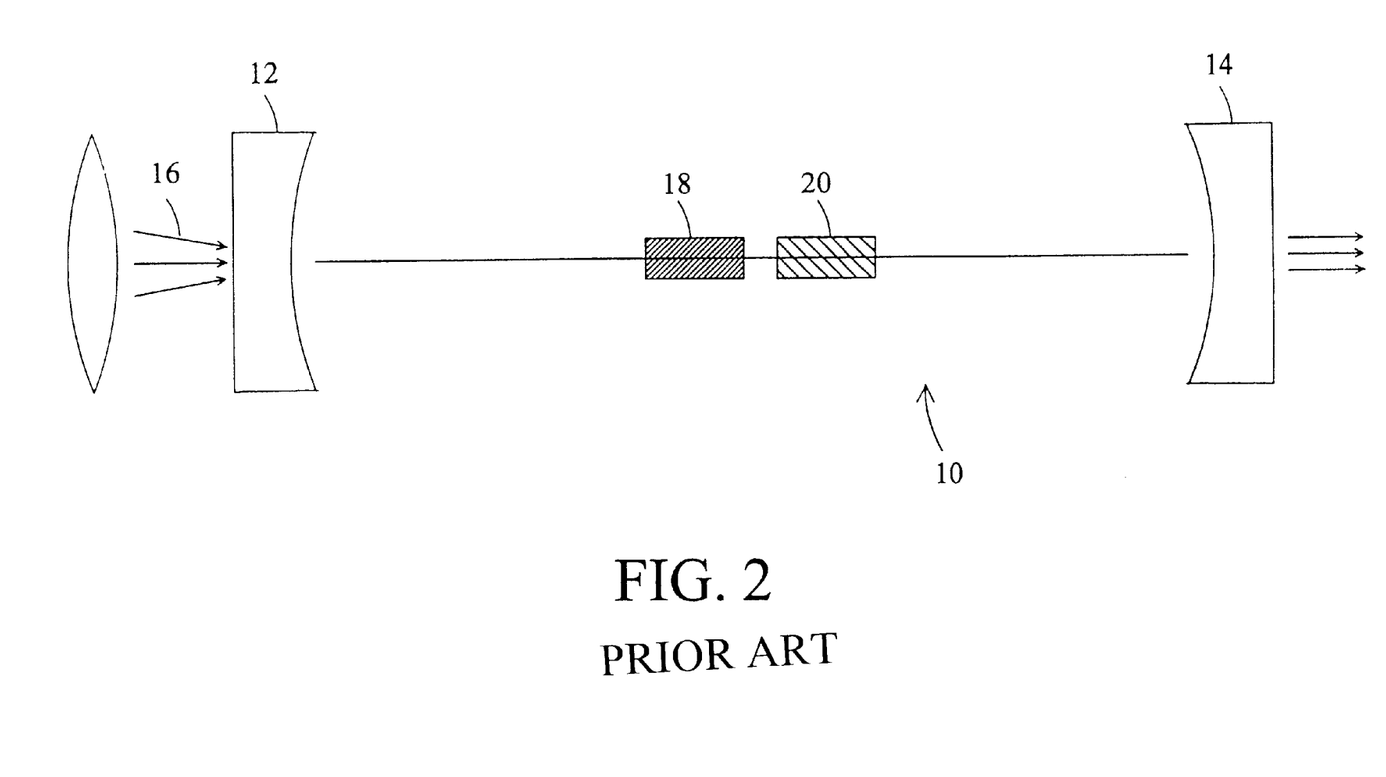
FIG. 2 is another more detailed diagram of a basic laser.

Referring to FIG. 2, a laser resonator 10 is normally bounded by end mirrors 12 and 14 which define the laser cavity with length L. End mirror 12 is optically coated to be highly reflective at the lasing wavelength (for Nd:YVO4 1064 nm) and highly transmissive at the pump wavelength (for Nd:YVO4 808 nm). End mirror 14 is optically coated to be highly reflective at the lasing wavelength but highly transmissive at the second harmonic wavelength (for Nd:YVO 5320 nm). The pump energy 16 is directed through the end mirror 12 and excites a volume within the active medium 18. The length of the active medium 18 is typically 1 mm to 5 mm, though any size may be used. Suitable active media crystals include but are not limited to Nd:YVO4, Nd:YLF, Nd:YAG, Nd:GdVO4, etc. The length of the active medium is in part determined by the requirement that the majority of the pump excitation energy be absorbed in the laser crystal.

A non-linear crystal 20 is also disposed in the laser resonator 10. The crystal 20 should typically have a length of about 1 mm to about 5 mm, though any size may be used. Suitable crystal materials include but are not limited to: KTP, LBO, BBO, $KnbO_3$, $LiNBO_3$, etc. Frequently these crystals are non-linear in their response. These crystals are fabricated, properly oriented in the laser cavity, and, if necessary heated to the appropriate temperature to be properly phase matched at the laser wavelength in order to provide efficient frequency doubling. Other materials and configurations may be included in the design of the particular laser, such as shown illustrated in U.S. Pat. No. 5,627,849, incorporated by reference herein.

Figure 3:
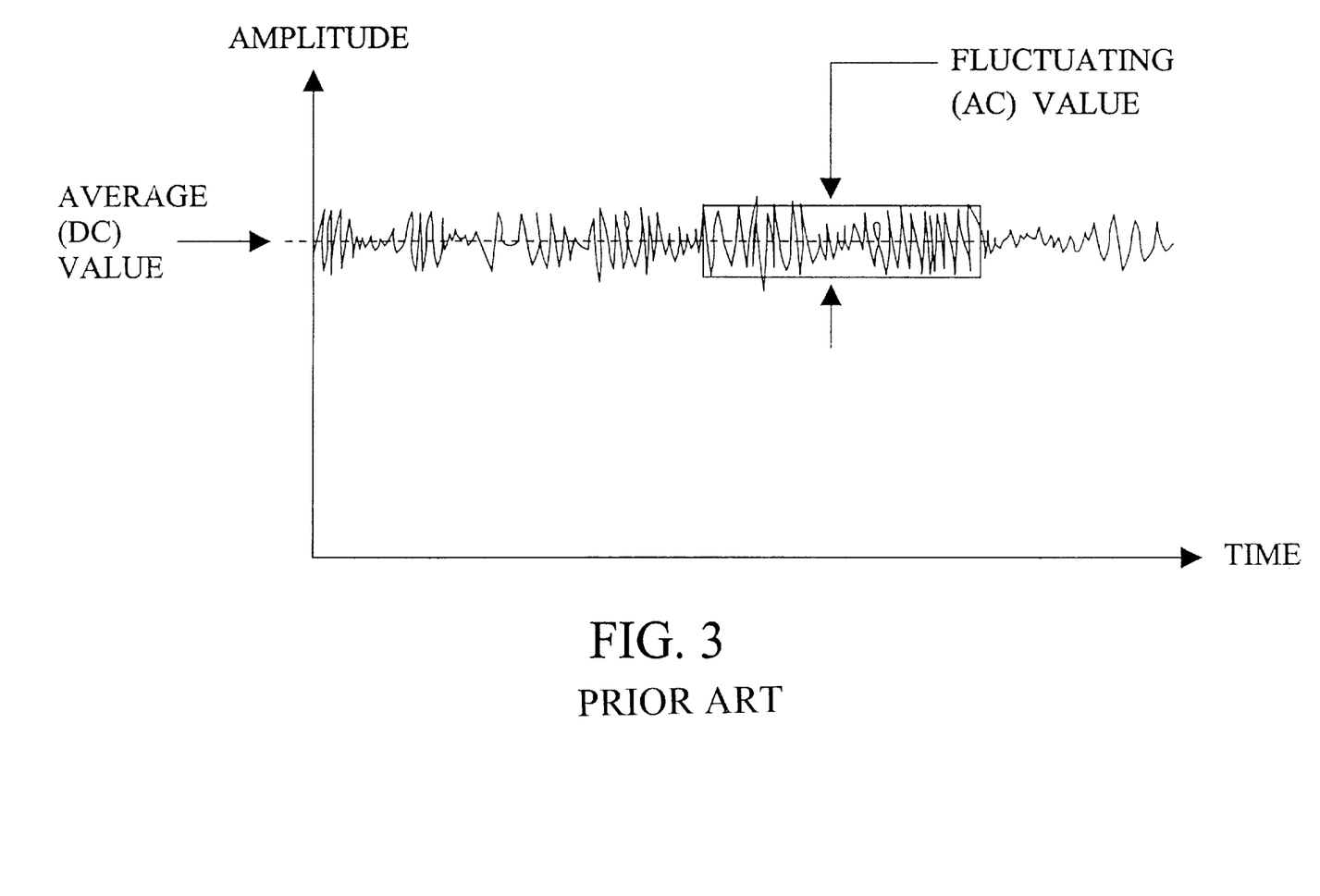
FIG. 3 illustrates one technique of noise amplitude measurement.

The output beam from any laser will posses characteristics which are less than ideal. As an example, the output power from a continuous wave (CW) laser will fluctuate over time. This fluctuation (noise) may have many origins. Usually the utility of a laser decreases as the noise increases. Referring to FIG. 3, one technique to characterize the amplitude noise of a laser beam is to direct a portion of the laser beam to be measured onto a fast response photodetector (DC to several tens of MHz). The output of the photodetector is displayed on an oscilloscope capable of accurately resolving the time and amplitude fluctuations of the laser beam. A ratio is made of the AC and DC components (the AC value in volts is divided by the DC value in volts). Multiplying this result by 100 gives the percent value of the noise contained in the laser beam. Other variations of this methodology exist. In a low noise signal the AC component will be a very small proportion of the DC value. The measurement of FIG. 3 shows a near maximum noise content over all frequencies resolvable by the measurement system (oscilloscope with photodetector). Rigorous noise characterization of signals may utilize a spectrum analyzer. Spectrum analyzers measure level versus frequency of the input signal.

What is desirable, therefore, is a laser with minimized noise, especially amplitude fluctuations.

DISCLOSURE OF THE INVENTION

The present invention overcomes the aforementioned drawbacks by providing an optical device having a first medium that produces more photons that exit the first medium than enter the first medium, such as a gain material. A second medium that produces light of a different wavelength than the wavelength of light incident thereon, such as a second harmonic generator. The optical device defines a cavity including the first medium and the second medium. An energy source provides energy to at least one of the first medium and the second medium so that light exits the cavity, the energy source is modified in a number of different manners such that the optical device has decreased noise output.

BEST MODES FOR CARRYING OUT THE INVENTION

The noise in intracavity doubled lasers results, at least in part, from the inherent structure of the device. Placing the SHG crystal and gain medium inside the same laser cavity couples together their two non-linear processes (laser gain, SHG). The resulting system is highly non-linear, unstable, and difficult to adjust for stability. In particular, intracavity doubled lasers typically suffer from excessively large amplitude fluctuations, chaotic in time, on the output beam. In addition, the fluctuations in amplitude may be magnified by the non-linear processes. In particular, fluctuations in the laser's amplitude may be magnified in the harmonic it produces. This situation has often been referred to as the "green problem".

Baer in a paper entitled Large-Amplitude Fluctuations Due to Longitudinal Mode Coupling In Diode-Pumped Intracavity-Doubled Nd:YAG Lasers, J. Opt. Soc. Am. B, Vol. 3, No. 9, September 1986, Pages 1175–1180, incorporated by reference herein, analyzes the amplitude noise situation and attributes the instabilities to coupling of the longitudinal modes of the laser oscillator by sum-frequency generation in the non-linear crystal. However, Baer offers no solution to reducing the amplitude noise other than a lengthy theoretical analysis. Baer notes that other authors have attributed the amplitude noise to thermo-optical absorption in the non-linear crystal, and in other cases to beating among the longitudinal modes of the laser.

Glenn et al. in a paper entitled Elimination Of Chaos In An Intracavity-Doubled Nd:YAG Laser, Opt. Letters, Vol. 15, No. 20, Oct. 15, 1990, Pages 1141–1143, incorporated by reference herein, predicts theoretically a stable configuration for the operation of a multimode, intracavity-doubled, diode-pumped Nd:YAG laser. Glenn et al. suggests that the irregular amplitude fluctuations observed are a manifestation of chaotic non-linear dynamics for certain parameter values. Glenn et al. then suggests that rotational alignment of the potassium titanyl phosphate (KTP) crystal can be used to obtain stable multilongitudinal mode output. This potential solution addresses fundamental laser design and may be difficult and expensive to implement. In addition, such a modification is not easily retrofitable to an existing laser.

Pierrou et al., in a paper entitled Generation Of 740 mW Of Blue Light By Intracavity Frequency Doubling With A First Order Quasi-Phase Matched KTiOPO4 Crystal, Opt. Letters, Vol. 24, No. 4, Feb. 15, 1999, Pages 205–207, incorporated by reference herein, describes an intracavity frequency doubled laser using poled crystals to permit the possibility of phase matching the non-linear processes. However, Pierrou et al. still observed fluctuations in the output power when switching between cw operation and the typical chaotic intensity fluctuations in intracavity frequency-doubled lasers. The reason for this bistable behavior was not clear to the author. Potential improvements suggested by Pierrou et al. include using looser focusing in the non-linear crystal, or by design of the quasi-phase-matching grating to compensate for the absorption-induced heating and detuning from phase matching. These potential solution addresses fundamental laser design and may be difficult and expensive to implement. In addition, such a modification is not easily retrofitable to an existing laser.

Martin et al. in a paper entitled Self-Suppression Of Axial Mode Hopping By Intracavity Second-Harmonic Generation, Opt. Letters, Vol. 22, No. 6, Mar. 15, 1997, Pages 375–377, incorporated by reference herein, suggests a technique for the suppression of mode hopping which may also enhance the stability of a laser with Intracavity Second Harmonic Generation. However, this potential solution addresses fundamental laser design and may be difficult and expensive to implement. In addition, such a modification is not easily retrofitable to an existing laser.

The design methodology traditionally employed to obtain an amplitude stabilized output is also to refine each portion of the laser to reduce the noise potentially resulting from that aspect. Accordingly in a manner similar to high quality audio components, the power supplied to a laser, and thus the power supplied to the pump source, is designed in such a manner to be as "clean" as possible. The goal is to remove as many imperfections from the power source as possible so that no additional irregularities are provided to the laser cavity that must be compensated for. Then the traditional design methodology includes refining the cavity, SHG, and gain medium, to likewise systematically remove as many potential sources of noise as possible. The design of the cavity, SHG, and gain medium, is based on the physics of the operation of the relevant laser. In the end, if each component is designed in such a manner to be as free from noise as possible, then the resulting device will hopefully likewise be free from noise. As can be observed from the aforementioned attempts to remove amplitude noise from intracavity lasers, it is a difficult dilemma because of the coupling of two non-linear aspects. The traditional wisdom is that if the proper relationship can be achieved primarily between the gain medium and the SHG, then the laser will have reduced amplitude noise. In light of these design criteria, the present inventors began to investigate potential solutions to the amplitude fluctuations in intracavity lasers.

The present inventors are in the process of developing and refining a laser based projection system, such as described in co-pending patent application Ser. No. 09/223,620, incorporated by reference herein, which requires multiple bright lasers of different colors. To project an image with the laser light onto a display, a technique is necessary to scan the laser beams over the viewing screen in a predetermined fashion. To provide amplitude modulation of the signal, the present inventors currently use acousto-optic modulators (AOMs), which are expensive. A standard AOM can modulate only a single laser beam with video information. Under optimum conditions the optical power efficiency (usable light coming out versus light going in) of an AOM can be as high as 70%, though usually it is much lower.

By way of background, gain switching is a technique used to increase the output intensity of a laser. The gain medium is very quickly "injected" with energy from a fast source (such as another laser). The laser pulse builds up from spontaneous emission coming from the gain medium after it has been pumped. This requires a finite amount of time during which the energy stored in the gain medium can be above the loss line of a laser cavity (the laser contains excess gain). Once the pulse energy builds up to the point that it can stimulate energy out of the gain medium it quickly extracts all the excess gain in the laser producing a sudden burst (short pulse) of laser light. The gain medium is then allowed to "relax" until the next excitation pulse arrives. These time intervals added together place an upper limit on the fastest repetition rate that a laser can be gain switched, e.g. 1/(build-up+relaxation time).

Three AOMs and three lasers (one red, one green, one blue) are currently required to make one full color laser video display. In an attempt to eliminate the AOMs and to increase the brightness of the lasers being used, gain switching was attempted. When successfully accomplished, it was thought that gain switching would provide a laser output of the gain switched laser that would be a short pulse of high amplitude light, higher than the DC component produced under steady state condition. If the amplitude of the gain switched pulses could be carefully controlled, AOMs would not be required to video modulate the laser beams, resulting in a substantial savings. Both these benefits would increase the brightness and significantly reduce the final cost of a laser based video projector.

Noise reduction of the lasers was also a serious concern. The cw laser sources being used all contained noise, some as high as 50%. The high noise, especially amplitude noise, resulted in a projected image that was not sufficiently sharp in detail. The present inventors envisioned that the noise characteristics of a gain switched laser may be much better. The present inventors further envisioned that the noise in the laser cavity of a cw laser requires time to build up. A pulsed laser would eliminate this build up time and avoid the trouble associated with amplitude fluctuations.

With proper laser cavity design, a laser can be repeatedly gain switched at high repetition rates, e.g. 1 KHz. However, it is necessary for video applications to gain switch the laser at video pixel rates, e.g. 13.5 MHz for NTSC, which is considerably faster. For microchip lasers, a diode laser is typically used as the pump source to the laser and was therefore considered a good candidate for gain switching because it can be directly (electrically) modulated at high frequencies.

A high frequency response pulsing circuit was designed and fabricated to drive the pump diode of a microchip laser that normally produces blue light. The pulsing circuit was designed, in accordance with gain switching, to provide short pulses (a few nanoseconds in duration) of current to the pump diode at a few MHz repetition rate. The pulsing circuit was attached to the pump diode of a blue microchip laser. Though the pulsing circuit functioned properly, the microchip laser failed to produce any blue light at all. The failure of the laser to produce light when employing gain switching at high frequencies disappointed the present inventors.

Instead of giving up on the potential of gain switching the present inventors closely investigated the output of the laser and came to the striking realization that infrared light was coming from the pump diode that accurately replicated the current pulses being sent to it, but still no blue light was being generated inside the laser cavity. Apparently the proper conditions for a laser to achieve lasing were not right, such as the number of photons in the gain medium and/or temperature considerations. The amplitude of the pulses, e.g. spikes, was adjusted in an attempt to achieve lasing which ultimately was unsuccessful.

Figure 4:
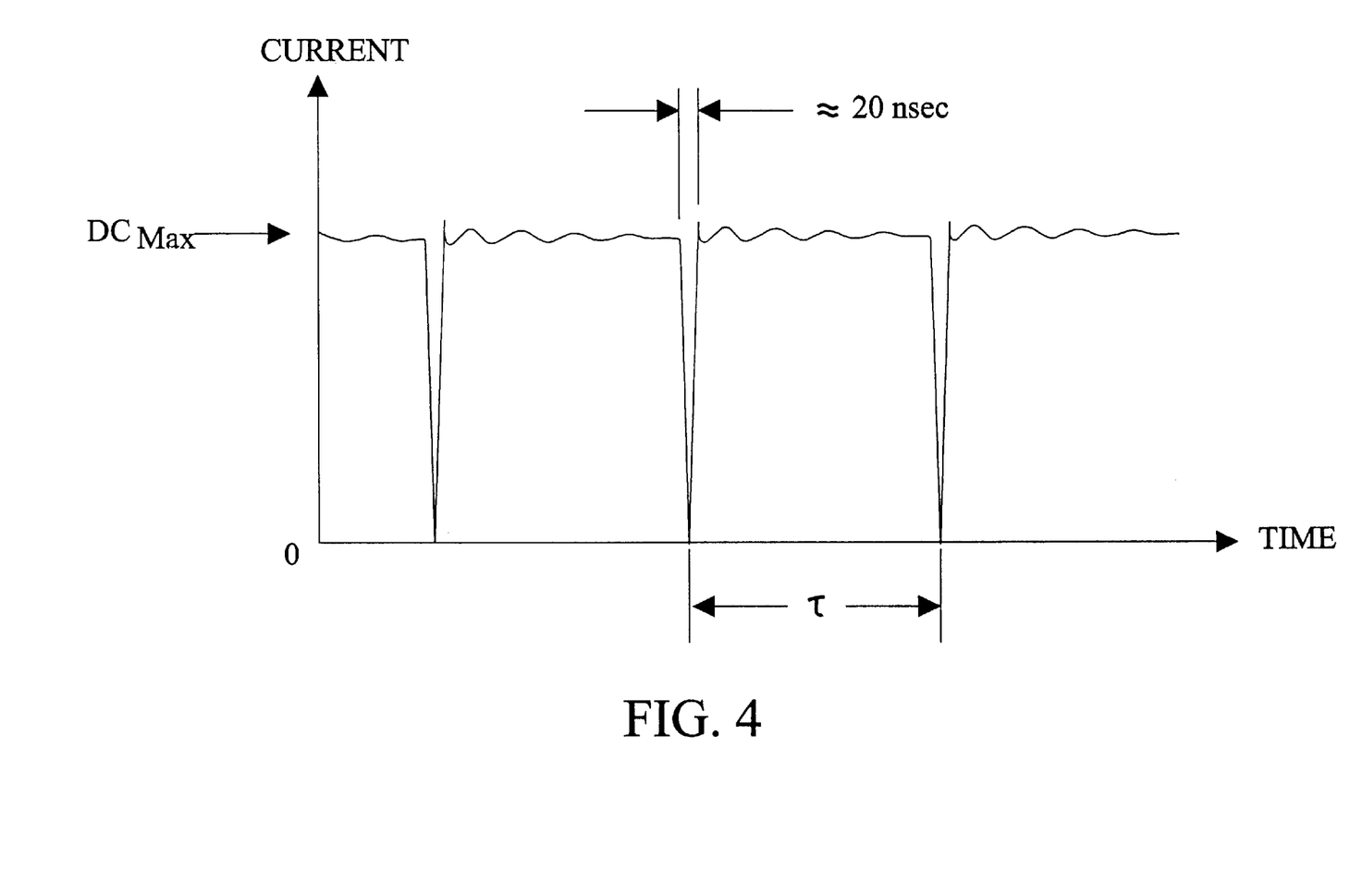
FIG. 4 illustrates an exemplary embodiment of the current to the pump diode versus time for the present invention.

In direct contrast to all previous scientific suggestions that the power to the pump diode should be as stable as possible to achieve amplitude stabled laser output, and the inability to gain switch the laser cavity as sufficiently high frequencies, the present inventors decided to invert the operation of the pulsing circuit that they had on hand, merely as a curiosity of what may occur given that the gain switching attempt was a failure. Based on the prior experiment of gain switching, the present inventors were aware that the pump diode could at least respond to high frequencies. Referring to FIG. 4, the pulse circuit provides a direct current ($DC_{max}$) offset which is pulsed toward zero.

$Dc_{max}$ is preferably the maximum steady state current that the pump diode can safely tolerate. The width of each negative going pulses is preferably made as narrow as possible, such as about 20 nanoseconds. The time between each "spike" (t) may be varied and is used as a parameter in the experimental data collection. The time 1/t was varied from tens of kilohertz to multiple megahertz. The downward spikes preferably reach zero amps. In other words, the electrical energy supplied to the pump was periodically interrupted.

To the astonishment of the present inventors, and in direct contrast to all accepted wisdom of laser design, the laser produced blue light with the inverted pulses, although the laser output still included significant amplitude noise. However, the noise was somewhat improved over traditional laser operation. A more rigorous analysis of the laser operation was performed to measure the noise content of the laser. While the pulsing circuit was driving the pump diode, the temperature compensation to the laser was modified. However, the present inventors came to the realization that the temperature of the laser system needed to be modified to a level different than the optimum phase matching temperature that is used when a uniform power source is supplied to the pump diode. With proper temperature compensation of the laser and pump diode the amplitude noise that has been the subject of much research was nearly non-existent.

Figure 5:
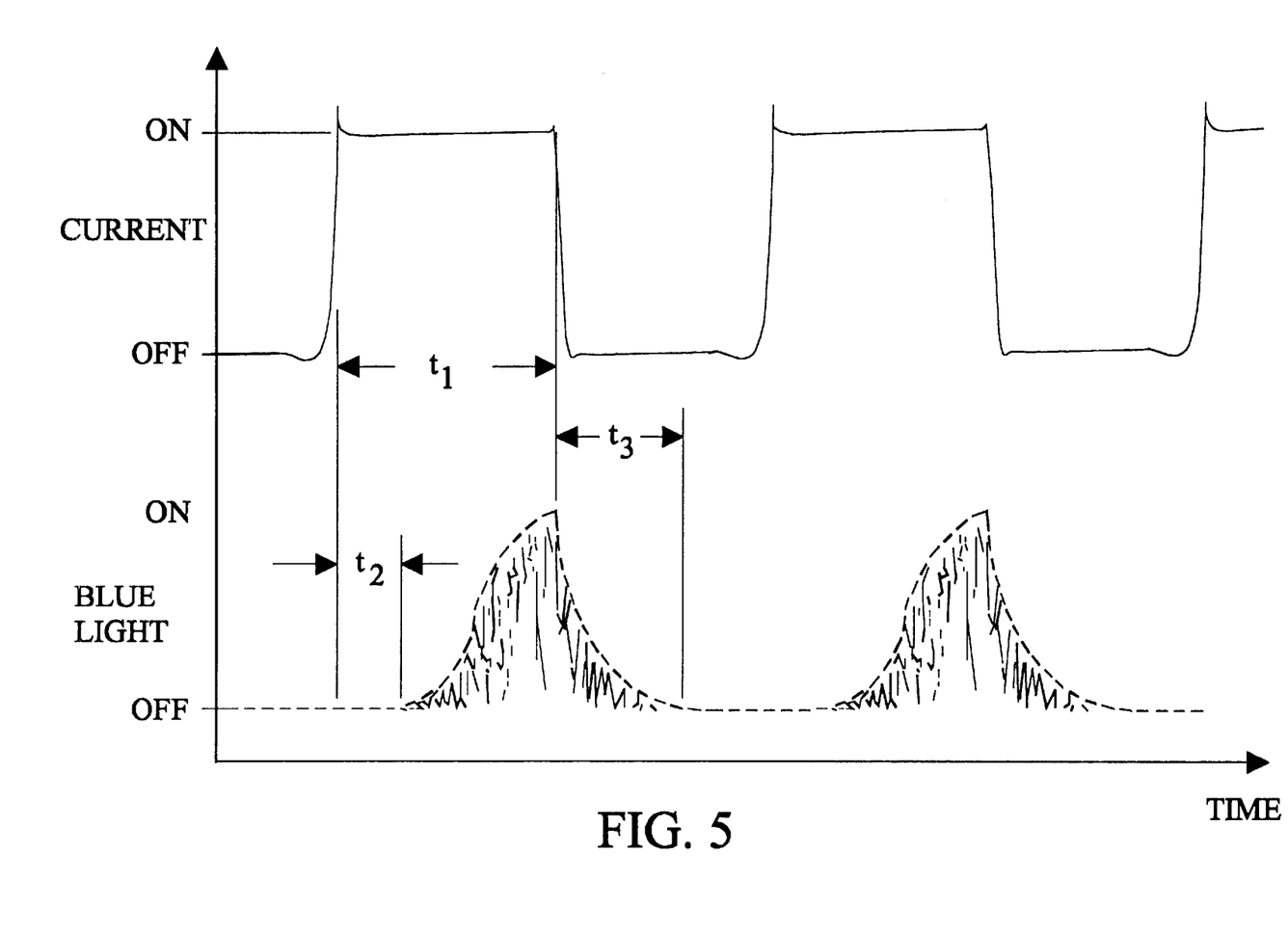
FIG. 5 illustrates an exemplary embodiment of the current to the pump diode and noise build up versus time.

An additional pulsing circuit was designed to provide approximately 50% duty cycle current pulses to the diode pump laser. The resulting blue light output of the microchip laser was measured using a fast photo detector, providing typical results as shown in FIG. 5. From this investigation it became apparent to the present inventors that there is a finite time from when the diode laser turns on to when (noisy) blue light begins to exit the laser (t2). The present inventors also came to the realization that there is a finite time from when the laser is turned off till blue lights stops exiting the laser (t3). These times (blue light build-up and decay) vary depending on the laser dynamics (gain medium and cavity design). One such example of times is t1=1.8 usec, t2=0.6 usec, and t3=1.6 usec, when pulsed at 278 KHz. The particular microchip laser being used was constructed of Nd:YAG as the gain medium and potassium niobate as the SHG crystal. The doubling crystal is non-critically phase matched (temperature tuned). Other non-phase matching may likewise be used. Initially the laser temperature was adjusted to produce the maximum amount of blue light output. At this temperature the output beam was noisy. As the temperature was slowly changed the laser suddenly entered its low noise regime.

The temperature of the microchip laser controls two parameters simultaneously, namely, phase matching and optical cavity length. To obtain quiet operation with the pulsing circuit operating at 4 MHz, it is preferable to tune the laser temperature to reach a critical cavity length at the expense of maximum optical output power. From the measurements shown in FIG. 5, it would appear that the output noise should decrease with the pulsing circuit operating at higher frequencies. This may eliminate the need for the cavity length to be held to some critical value. This would then allow the SHG crystal temperature to control only (or substantially independently) its phase matching.

It is postulated by the present inventors that the chaotic noise generation of the laser is reset by the pulsing nature of the circuit. In addition, light is emitted from the laser when the laser diode is pulsed due to cavity decay. In this manner the chaotic noise does not contribute to the output laser amplitude fluctuations. In this manner the present inventors have discarded many traditional laser system design tenants, which includes the reduction of any non-steady state inputs, to achieve a significant benefit. In addition the energy inputted to the pump diode is preferably periodic in nature. Moreover, the energy inputted to the pump diode is preferably in a known predetermined manner, unlike merely injecting "noise" into the system which is not predetermined nor is it periodic.

Preferably the gain modulation is designed to minimally modulate the output beam. The "spikes" sent to the gain medium are preferably substantially shorter (nanoseconds) than the relaxation time of the laser (t3=1.6 usec, see FIG. 5). It is noted that preferably the energy to the laser cavity is free from external sources other than the pump diode.

It is also noted that gain switching requires the pump to be "on" for a specific period of time then it's turned "off" for another specific length of time to stop the lasing action. The preferred embodiment of the present invention does not turn the gain off long enough to stop the lasing action, but merely long enough to perturb the noise generation process. In addition, the time between the modulation "spikes" is substantially shorter than the build up time of the laser thus preventing the laser from being gain switched. The width of the modulation spike (nanoseconds) is substantially shorter than the relaxation time of the laser, which also prevents the laser from being gain switched. Also, by not allowing the gain medium to significantly relax, the output beam is continuous (not pulsed).

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

I claim:

1. An optical device comprising:
   (a) a first medium that produces more photons that exit said first medium than enter said first medium;
   (b) a second medium that produces light of a different wavelength than the wavelength of light incident thereon;
   (c) said optical device defining a cavity including said first medium and said second medium; and
   (d) an energy device positioned with respect to at least one of said first medium and said second medium such that it provides energy to at least one of said first medium and said second medium so that light exits said cavity, wherein a control mechanism associated with said energy device provides said energy in intervals less than the inverse of the summation of the build up time of said first medium and the relaxation time of said first medium.

2. The optical device of claim 1 wherein said light exiting said cavity is laser light.

3. The optical device of claim 1 wherein said first medium is a gain medium.

4. The optical device of claim 1 wherein said second medium is a harmonic generator.

5. The optical device of claim 4 wherein said second medium is a second harmonic generator.

6. The optical device of claim 5 wherein said cavity includes a plurality of reflecting surfaces.

7. The optical device of claim 1 wherein said energy device provides energy in the form of light.

8. The optical device of claim 7 wherein energy is in the form of laser light.

9. The optical device of claim 6 wherein one of said reflecting surfaces is substantially reflective to said incident light and substantially transmissive to said different light.

10. The optical device of claim 1 wherein said optical device is an intracavity doubled optical device.

11. An optical device comprising:
(a) a first medium that produces more photons that exit said first medium than enter said first medium;
(b) a second medium that produces light of a different wavelength than the wavelength of light incident thereon;
(c) said optical device defining a cavity including said first medium and said second medium; and
(d) an energy device positioned with respect to at least one of said first medium and said second medium such that it provides energy to at least one of said first medium and said second medium so that light exits said cavity, wherein a control mechanism associated with said energy device provides said energy with a substantially steady state value together with a plurality of decreases below said steady state value of a time duration of substantially less than the time between said decreases.

12. The optical device of claim 11 wherein said energy device provides said energy in intervals less than the inverse of the summation of the build up time of said first medium and the relaxation time of said first medium.

13. The optical device of claim 11 wherein said energy device provides said energy with a substantially steady state signal with periodic interruptions of a non-steady state signal.

14. The optical device of claim 11 wherein said energy device provides said energy with a substantially steady state signal with non-periodic interruptions of a non-steady state manner.

15. The optical device of claim 11 wherein said second medium is non-phase matched and said energy device provide at least one of said energy with periodic and non-periodic interruptions.

16. The optical device of claim 11 wherein said energy device provides said energy in a predetermined manner with at least one of periodic and non-periodic interruptions during which said first medium continues lasing.

17. The optical device of claim 11 wherein said energy device provides said energy with changes in its energy level substantially shorter than the build-up time of the first medium.

18. The optical device of claim 11 wherein said energy device provides said energy with changes in its energy level substantially shorter than the relaxation time of the first medium.

19. The optical device of claim 11 wherein said optical device is an intracavity doubled optical device.

20. An optical device comprising:
(a) a first medium that produces more photons that exit said first medium than enter said first medium;
(b) a second medium that produces light of a different wavelength than the wavelength of light incident thereon;
(c) said optical device defining a cavity including said first medium and said second medium; and
(d) an energy device positioned with respect to at least one of said first medium and said second medium such that it provides energy to at least one of said first medium and said second medium so that light exits said cavity, wherein a control mechanism associated with said energy device provides said energy with a substantially steady state signal with periodic and non-steady state interruptions.

21. The optical device of claim 20 wherein said energy device provides said energy in intervals less than the inverse of the summation of the build up time of said first medium and the relaxation time of said first medium.

22. The optical device of claim 20 wherein said energy device provides said energy with a substantially steady state value together with a plurality of decreases below said steady state value of a time duration of substantially less than the time between said decreases.

23. The optical device of claim 20 wherein said energy device provides said energy with a substantially steady state signal with periodic interruptions of a non-steady state signal.

24. The optical device of claim 20 wherein said second medium is non-phase matched and said energy device provides at least one of said energy with periodic and non-periodic interruptions.

25. The optical device of claim 20 wherein said energy device provides said energy in a predetermined manner with at least one of periodic and non-periodic interruptions during which said first medium continues lasing.

26. The optical device of claim 20 wherein said energy device provides said energy with changes in its energy level substantially shorter than the build-up time of the first medium.

27. The optical device of claim 20 wherein said energy device provides said energy with changes in its energy level substantially shorter than the relaxation time of the first medium.

28. The optical device of claim 20 wherein said optical device is an intracavity doubled optical device.

29. An optical device comprising:
(a) a first medium that produces more photons that exit said first medium than enter said first medium;
(b) a second medium that produces light of a different wavelength than the wavelength of light incident thereon;
(c) said optical device defining a cavity including said first medium and said second medium; and
(d) an energy device positioned with respect to at least one of said first medium and said second medium such that it provides energy to at least one of said first medium and said second medium so that light exits said cavity, wherein a control mechanism associated with said energy device provides said energy with a substantially steady state signal with non-periodic and non-steady state interruptions.

30. The optical device of claim 29 wherein said energy device provides said energy in intervals less than the inverse of the summation of the build up time of said first medium and the relaxation time of said first medium.

31. The optical device of claim 29 wherein said energy device provides said energy with a substantially steady state value together with a plurality of decreases below said steady state value of a time duration of substantially less than the time between said decreases.

32. The optical device of claim 29 wherein said energy device provides said energy with a substantially steady state signal with periodic interruptions of a non-steady state signal.

33. The optical device of claim 29 wherein said second medium is non-phase matched and said energy device provides at least one of said energy with periodic and non-periodic interruptions.

34. The optical device of claim 29 wherein said energy device provides said energy in a predetermined manner with at least one of periodic and non-periodic interruptions during which said first medium continues lasing.

35. The optical device of claim 29 wherein said energy device provides said energy with changes in its energy level substantially shorter than the build-up time of the first medium.

36. The optical device of claim 29 wherein said energy device provides said energy with changes in its energy level substantially shorter than the relaxation time of the first medium.

37. The optical device of claim 29 wherein said optical device is an intracavity doubled optical device.

38. An optical device comprising:
(a) a first medium that produces more photons that exit said first medium than enter said first medium;
(b) a second medium that produces light of a different wavelength than the wavelength of light incident thereon;
(c) said optical device defining a cavity including said first medium and said second medium;
(d) an energy device positioned with respect to at least one of said first medium and said second medium such that it provides energy to at least one of said first medium and said second medium so that light exits said cavity, wherein said second medium is non-phase matched and a control mechanism associated with said energy device provides at least one of said energy with periodic and non-periodic interruptions.

39. The optical device of claim 38 wherein said energy device provides said energy in intervals less than the inverse of the summation of the build up time of said first medium and the relaxation time of said first medium.

40. The optical device of claim 38 wherein said energy device provides said energy with a substantially steady state value together with a plurality of decreases below said steady state value of a time duration of substantially less than the time between said decreases.

41. The optical device of claim 38 wherein said energy device provides said energy with a substantially steady state signal with periodic interruptions of a non-steady state signal.

42. The optical device of claim 38 wherein said second medium is non-phase matched and said energy device provides at least one of said energy with periodic and non-periodic interruptions.

43. The optical device of claim 38 wherein said energy device provides said energy in a predetermined manner with at least one of periodic and non-periodic interruptions during which said first medium continues lasing.

44. The optical device of claim 38 wherein said energy device provides said energy with changes in its energy level substantially shorter than the build-up time of the first medium.

45. The optical device of claim 38 wherein said energy device provides said energy with changes in its energy level substantially shorter than the relaxation time of the first medium.

46. The optical device of claim 38 wherein said optical device is an intracavity doubled optical device.

47. An optical device comprising:
(a) a first medium that produces more photons that exit said first medium than enter said first medium;
(b) a second medium that produces light of a different wavelength than the wavelength of light incident thereon;
(c) said optical device defining a cavity including said first medium and said second medium;
(d) an energy device positioned with respect to at least one of said first medium and said second medium such that it provides energy to at least one of said first medium and said second medium so that light exits said cavity, wherein a control mechanism associated with said energy device provides said energy in a predetermined manner with at least one of periodic and non-periodic interruptions during which said first medium continues lasing.

48. The optical device of claim 47 wherein said energy device provides said energy in intervals less than the inverse of the summation of the build up time of said first medium and the relaxation time of said first medium.

49. The optical device of claim 47 wherein said energy device provides said energy with a substantially steady state value together with a plurality of decreases below said steady state value of a time duration of substantially less than the time between said decreases.

50. The optical device of claim 47 wherein said energy device provides said energy with a substantially steady state signal with periodic interruptions of a non-steady state signal.

51. The optical device of claim 47 wherein said energy device provides said energy with a substantially steady state signal with non-periodic interruptions of a non-steady state manner.

52. The optical device of claim 47 wherein said second medium is non-phase matched and said energy device provides at least one of said energy with periodic and non-periodic interruptions.

53. The optical device of claim 47 wherein said energy device provides said energy with changes in its energy level substantially shorter than the build-up time of the first medium.

54. The optical device of claim 47 wherein said energy device provides said energy with changes in its energy level substantially shorter than the relaxation time of the first medium.

55. The optical device of claim 47 wherein said optical device is an intracavity doubled optical device.

56. An optical device comprising:
(a) a first medium that produces more photons that exit said first medium than enter said first medium;
(b) a second medium that produces light of a different wavelength than the wavelength of light incident thereon;
(c) said optical device defining a cavity including said first medium and said second medium;
(d) an energy device positioned with respect to at least one of said first medium and said second medium such that it provides energy to at least one of said first medium and said second medium so that light exits said cavity, wherein a control mechanism associated with said energy device provides said energy with changes in its energy level substantially shorter than the build-up time of the first medium.

57. The optical device of claim 56 wherein said energy device provides said energy in intervals less than the inverse of the summation of the build up time of said first medium and the relaxation time of said first medium.

58. The optical device of claim 56 wherein said energy device provides said energy with a substantially steady state value together with a plurality of decreases below said steady state value of a time duration of substantially less than the time between said decreases.

59. The optical device of claim 56 wherein said energy device provides said energy with a substantially steady state signal with periodic interruptions of a non-steady state signal.

60. The optical device of claim 56 wherein said energy device provides said energy with a substantially steady state signal with non-periodic interruptions of a non-steady state manner.

61. The optical device of claim 56 wherein said second medium is non-phase matched and said energy device provides at least one of said energy with periodic and non-periodic interruptions.

62. The optical device of claim 56 wherein said energy device provides said energy in a predetermined manner with at least one of periodic and non-periodic interruptions during which said first medium continues lasing.

63. The optical device of claim 56 wherein said energy device provides said energy with changes in its energy level substantially shorter than the relaxation time of the first medium.

64. The optical device of claim 56 wherein said optical device is an intracavity doubled optical device.

65. An optical device comprising:
  (a) a first medium that produces more photons that exit said first medium than enter said first medium;
  (b) a second medium that produces light of a different wavelength than the wavelength of light incident thereon;
  (c) said optical device defining a cavity including said first medium and said second medium;
  (d) an energy device positioned with respect to at least one of said first medium and said second medium such that it provides energy to at least one of said first medium and said second medium so that light exits said cavity, wherein a control mechanism associated with said energy device provides said energy with changes in its energy level substantially shorter than the relaxation time of the first medium.

66. The optical device of claim 56 wherein said energy device provides said energy with changes in its energy level substantially shorter than the build-up time of the first medium.

67. The optical device of claim 65 wherein said optical device is an intracavity doubled optical device.

68. A method of adjusting an optical device comprising:
  (a) providing a first medium that produces more photons that exit said first medium than enter said first medium;
  (b) providing a second medium that produces light of a different wavelength than the wavelength of light incident thereon;
  (c) providing said optical device defining a cavity including said first medium and said second medium; and
  (d) providing energy to at least one of said first medium and said second medium so that light exits said cavity, wherein said energy is non-uniform and adjusting the temperature of the optical device to an energy level different than the optimum phase matching temperature used when a uniform energy is provided to said at least one of said first and second mediums such that the amplitude noise of said light is reduced more than it would have been had the temperature been adjusted to said optimum phase matching temperature.

69. The method of claim 68 wherein said energy device provides said energy in intervals less than the inverse of the summation of the build up time of said first medium and the relaxation time of said first medium.

70. The method of claim 68 wherein said energy device provides said energy with a substantially steady state signal with periodic interruptions of a non-steady state signal.

71. The method of claim 68 wherein said energy device provides said energy with a substantially steady state signal with non-periodic interruptions of a non-steady state manner.

72. The method of claim 68 wherein said second medium is non-phase matched and said energy device provides at least one of said energy with periodic and non-periodic interruptions.

73. The method of claim 68 wherein said energy device provides said energy in a predetermined manner with at least one of periodic and non-periodic interruptions during which said first medium continues lasing.

74. The method of claim 68 wherein said energy device provides said energy with changes in its energy level substantially shorter than the build-up time of the first medium.

75. The method of claim 68 wherein said energy device provides said energy with changes in its energy level substantially shorter than the relaxation time of the first medium.

* * * * *